US010941863B2

(12) United States Patent
Negishi et al.

(10) Patent No.: US 10,941,863 B2
(45) Date of Patent: Mar. 9, 2021

(54) SLIDING COMPONENT

(71) Applicant: EAGLE INDUSTRY CO., LTD., Tokyo (JP)

(72) Inventors: Yuta Negishi, Tokyo (JP); Sayaka Kosugi, Tokyo (JP); Hideyuki Inoue, Tokyo (JP); Takeshi Hosoe, Tokyo (JP); Yuichiro Tokunaga, Tokyo (JP)

(73) Assignee: Eagle Industry Co., Ltd.

( * ) Notice: Subject to any disclaimer, the term of this patent is extended or adjusted under 35 U.S.C. 154(b) by 60 days.

(21) Appl. No.: 16/347,657

(22) PCT Filed: Nov. 6, 2017

(86) PCT No.: PCT/JP2017/039905
§ 371 (c)(1),
(2) Date: May 6, 2019

(87) PCT Pub. No.: WO2018/088353
PCT Pub. Date: May 17, 2018

(65) Prior Publication Data
US 2019/0316682 A1 Oct. 17, 2019

(30) Foreign Application Priority Data
Nov. 14, 2016 (JP) .............................. JP2016-221386

(51) Int. Cl.
*F16J 15/34* (2006.01)
(52) U.S. Cl.
CPC ..................................... *F16J 15/34* (2013.01)
(58) Field of Classification Search
CPC ...... F16J 15/34; F16J 15/3404; F16J 15/3408; F16J 15/3412; F16J 15/3416; F16J 15/3424
See application file for complete search history.

(56) References Cited

U.S. PATENT DOCUMENTS 3,147,013 A * 9/1964 Tracy ..................... F16J 15/342
277/400
3,176,910 A * 4/1965 Bentele .................. F01C 19/08
418/61.2

(Continued)

FOREIGN PATENT DOCUMENTS

WO WO-2014-050920 A1 4/2014
WO WO-2014-148316 A1 9/2014

(Continued)

*Primary Examiner* — Vishal A Patel
*Assistant Examiner* — L. Susmitha Koneru
(74) *Attorney, Agent, or Firm* — Harness, Dickey & Pierce, P.L.C.

(57) ABSTRACT

A sliding component includes a pair of sliding parts of which a rotating-side sliding part rotates in both forward and reverse directions. In the sliding component, at least one of the sliding parts has a sliding face provided with positive pressure generation grooves on the sealed fluid side, and a negative pressure generation groove on the opposite-to-sealed-fluid side and separated from the opposite-to-sealed-fluid side by a land, and a deep groove communicating with the sealed fluid side on the sealed fluid side of the negative pressure generation groove. The positive pressure generation grooves each have an upstream end communicating with the deep groove, and the negative pressure generation groove has an upstream inlet and a downstream outlet that communicate with the deep groove, and an intermediate portion between the inlet and the outlet located on the opposite-to-sealed-fluid side of the inlet and the outlet.

6 Claims, 6 Drawing Sheets

(56) References Cited

U.S. PATENT DOCUMENTS

| | | | | |
|---|---|---|---|---|
| 3,333,855 A * | 8/1967 | Andresen | F16J 15/38 | 277/581 |
| 3,672,689 A * | 6/1972 | Hadley | F16J 15/38 | 277/373 |
| 3,746,350 A * | 7/1973 | Mayer | F16J 15/3404 | 277/399 |
| 4,082,296 A * | 4/1978 | Stein | F16J 15/3412 | 277/400 |
| 4,145,058 A * | 3/1979 | Hady | F16J 15/441 | 277/366 |
| 4,155,561 A * | 5/1979 | Rudy | F16L 23/18 | 277/641 |
| 4,407,513 A * | 10/1983 | Takenaka | F16J 15/3412 | 277/400 |
| 4,416,458 A * | 11/1983 | Takenaka | F16J 15/3412 | 277/399 |
| 5,246,295 A * | 9/1993 | Ide | F16J 15/3432 | 384/124 |
| 5,388,843 A * | 2/1995 | Sedy | F16J 15/3412 | 277/397 |
| 5,498,007 A * | 3/1996 | Kulkarni | F16J 15/3412 | 277/400 |
| 5,509,664 A * | 4/1996 | Borkiewicz | F16J 15/442 | 277/543 |
| 5,556,111 A * | 9/1996 | Sedy | F16J 15/3412 | 277/400 |
| 5,558,341 A * | 9/1996 | McNickle | F16J 15/3488 | 277/400 |
| 6,446,976 B1 * | 9/2002 | Key | F16J 15/3416 | 277/367 |
| 6,575,470 B1 * | 6/2003 | Gacek | F16J 15/3412 | 277/399 |
| 9,638,326 B2 * | 5/2017 | Haynes | F16J 15/441 | |
| 9,927,033 B2 * | 3/2018 | Baheti | F16J 15/442 | |
| 2012/0217705 A1 * | 8/2012 | Hosoe | F16J 15/3412 | 277/400 |
| 2015/0115537 A1 * | 4/2015 | Tokunaga | F16J 15/34 | 277/348 |
| 2015/0377297 A1 | 12/2015 | Tokunaga et al. | | |
| 2016/0047476 A1 | 2/2016 | Kiernan | | |
| 2017/0067510 A1 | 3/2017 | Hosoe et al. | | |
| 2017/0241549 A1 | 8/2017 | Itadani et al. | | |

FOREIGN PATENT DOCUMENTS

| | | |
|---|---|---|
| WO | WO-2015-125950 A1 | 8/2015 |
| WO | WO-2016-072325 A1 | 5/2016 |

* cited by examiner

SEALED FLUID SIDE

OPPOSITE-TO-SEALED-FLUID SIDE

SLIDING COMPONENT

CROSS REFERENCE TO RELATED APPLICATIONS

This application is a U.S. National Stage Application of International Application No. PCT/JP2017/039905, filed on Nov. 6, 2017, and published in Japanese as WO 2018/088353 on May 17, 2018 and claims priority to Japanese Application No. 2016-221386, filed on Nov. 14, 2016. The entire disclosures of the above applications are incorporated herein by reference.

BACKGROUND

Technical Field

The present invention relates to sliding components suitable, for example, as mechanical seals, bearings, and other sliding units. More particularly, the present invention relates to sliding components such as seal rings or bearings that require friction reduction by fluid intervention between sliding faces, and prevention of fluid leakage from the sliding faces.

Related Art

A mechanical seal, an example of a sliding component, is evaluated for its performance based on the leakage rate, wear rate, and torque. Conventional arts have optimized the sliding materials and the sliding face roughness of mechanical seals to enhance performance and achieve low leakage, long life, and low torque. However, due to growing awareness of environmental problems in recent years, a further improvement in the performance of mechanical seals has been required, and technical development beyond the limits of the conventional arts has been necessary.

Under these circumstances, the present applicant has filed a patent application for an invention of a sliding component that does not leak during rest and operates with fluid lubrication while preventing leakage during rotation including the early stages of rotation, to be able to achieve both sealing and lubrication (hereinafter, referred to as the "conventional art." See WO 2014/050920 A1).

This conventional art forms a fluid lubrication film between sliding faces by positive pressure generated at positive pressure generation regions, while providing pumping action of drawing fluid that has leaked to the low-pressure fluid side back to the high-pressure fluid side. As an embodiment of the conventional art, disclosed is an invention of a sliding component as shown in FIGS. 18 to 20 of WO 2014/050920 A1, which can form a fluid film with positive pressure generation mechanisms formed of Rayleigh steps arranged on the high-pressure fluid side for lubrication, while performing sealing with dimples arranged on the low-pressure fluid side, and is configured to be applicable to a case where a rotating-side seal ring rotates in both forward and reverse directions.

The above conventional art is excellent in that it does not leak during rest and operates with fluid lubrication while preventing leakage during rotation including the early stages of rotation, to be able to achieve both sealing and lubrication. However, the present inventors have found that since the dimples are grooves each enclosed by a land and independent on the sliding face, when foreign matter or air bubbles enter the dimples, the foreign matter or air bubbles cannot be discharged to the outside of the dimples, which can cause leakage and wear, burn-damage, and the like due to friction heating of the sliding faces, deteriorating the functions of the mechanical seal.

The present invention has been made to solve the problem of the conventional art while making use of its advantages. It is an object of the present invention to provide a sliding component that can take in fluid actively to the entire sliding face to prevent wear, burn-damage, and the like due to friction heating of sliding faces and prevent leakage, while satisfying conflicting conditions of sealing and lubrication, which sliding component is adapted to be able to discharge foreign matter or air bubbles taken into negative pressure generation grooves, thereby to be able to maintain the sealing function of the sliding faces for a long time.

SUMMARY OF THE INVENTION

To attain the above object, a sliding component according to a first aspect of the present invention includes a pair of sliding parts of which a rotating-side sliding part rotates in both forward and reverse directions. The sliding component is characterized in that at least one of the sliding parts has a sliding face that is provided with positive pressure generation grooves located on a sealed fluid side, and is provided with a negative pressure generation groove located on an opposite-to-sealed-fluid side and separated from an opposite-to-sealed-fluid side by a land, and is provided with a deep groove communicating with a sealed fluid side on the sealed fluid side of the negative pressure generation groove, and the positive pressure generation grooves each have an upstream end communicating with the deep groove, and the negative pressure generation groove has an upstream inlet portion and a downstream outlet portion that communicate with the deep groove, and an intermediate portion between the inlet portion and the outlet portion located on an opposite-to-sealed-fluid side of the inlet portion and the outlet portion.

According to this aspect, in the sliding component that rotates in both forward and reverse directions, the gap between the sliding faces sliding relatively is widened by positive pressure, a liquid film is formed between the sliding faces, and suction is created on the opposite-to-sealed-fluid side of the sliding face, preventing leakage from the sealed fluid side to the opposite-to-sealed-fluid side. Further, even when foreign matter or air bubbles enter the negative pressure generation groove, the foreign matter or air bubbles are discharged to the sealed fluid side through the deep groove, so that the sealing function of the sliding faces can be maintained for a long time.

According to a second aspect of the present invention, the sliding component in the first aspect is characterized in that the inlet portion and the outlet portion are each formed in a tapered shape tapered from the deep groove side toward the intermediate portion.

According to this aspect, an effect of discharging foreign matter or air bubbles that have entered the negative pressure generation groove can be enhanced.

According to a third aspect of the present invention, the sliding component in the first aspect is characterized in that connections between the inlet portion and the outlet portion and the deep groove each include a stagnation portion that intersects a flow direction of fluid in the deep groove and spreads toward the opposite-to-sealed-fluid side.

According to this aspect, a pumping effect produced by the flow can be further enhanced, and fluid sucking action can be further increased from the intermediate portion to the vicinity of the outlet portion.

According to a fourth aspect of the present invention, the sliding component in the third aspect is characterized in that the stagnation portion at the inlet portion is shaped to spread upstream, and the stagnation portion at the outlet portion is shaped to spread downstream.

According to this aspect, a pumping effect produced by the flow can be further enhanced, and fluid sucking action can be further increased from the intermediate portion to the vicinity of the outlet portion.

According to a fifth aspect of the present invention, the sliding component in any one of the first to fourth aspects is characterized in that the deep groove includes a radial deep groove and a circumferential deep groove.

According to this aspect, the deep groove can serve to guide fluid that tends to leak from the sealed fluid side to the opposite-to-sealed-fluid side of the sliding face, to release the fluid to the sealed fluid side, and allows the positive pressure generation grooves and the negative pressure generation groove to be arranged rationally without waste on the sliding face of the sliding part that rotates in both forward and reverse directions.

According to a sixth aspect of the present invention, the sliding component in any one of the first to fifth aspects is characterized in that the positive pressure generation grooves are arranged on opposite sides of the radial deep groove symmetrically about a radial line connecting a circumferential center of the radial deep groove and a rotation center.

According to this aspect, the arrangement of the positive pressure generation grooves on the sliding face can be a rational one suitable for the sliding part that rotates in both forward and reverse directions.

According to a seventh aspect of the present invention, the sliding component in any one of the first to sixth aspects is characterized in that the negative pressure generation groove is arranged symmetrically about a radial line connecting a circumferential center of the negative pressure generation groove and a rotation center.

According to this aspect, the arrangement of the negative pressure generation groove on the sliding face can be a rational one suitable for the sliding part that rotates in both forward and reverse directions.

According to an eighth aspect of the present invention, the sliding component in any one of the first to seventh aspects is characterized in that the circumferential deep groove is arranged in a radial space between the positive pressure generation grooves and the negative pressure generation groove, and is arranged to extend circumferentially continuously through the radial deep groove.

According to this aspect, the circumferential deep groove can release dynamic pressure (positive pressure) generated at the positive pressure generation mechanisms to the pressure of high pressure-side fluid, to prevent fluid from flowing into the negative pressure generation mechanism on the low-pressure side and weakening the negative pressure generation capacity of the negative pressure generation mechanism.

Effect of the Invention

The present invention achieves the following outstanding effects.
(1) In the sliding component with the pair of sliding parts of which the rotating-side sliding part rotates in both forward and reverse directions, at least one of the sliding parts has the sliding face that is provided with the positive pressure generation grooves located on the sealed fluid side, and is provided with the negative pressure generation groove located on the opposite-to-sealed-fluid side and separated from the opposite-to-sealed-fluid side by the land, and is provided with the deep groove communicating with the sealed fluid side on the sealed fluid side of the negative pressure generation groove, and the positive pressure generation grooves each have the upstream end communicating with the deep groove, and the negative pressure generation groove has the upstream inlet portion and the downstream outlet portion that communicate with the deep groove, and the intermediate portion between the inlet portion and the outlet portion located on the opposite-to-sealed-fluid side of the inlet portion and the outlet portion. Consequently, in the sliding component that rotates in both forward and reverse directions, the gap between the sliding faces sliding relatively is widened by positive pressure, a liquid film is formed between the sliding faces, and suction is created on the opposite-to-sealed-fluid side of the sliding face, preventing leakage from the sealed fluid side to the opposite-to-sealed-fluid side. Further, even when foreign matter or air bubbles enter the negative pressure generation groove, the foreign matter or air bubbles are discharged to the sealed fluid side through the deep groove, so that the sealing function of the sliding faces can be maintained for a long time.
(2) The inlet portion and the outlet portion are each formed in a tapered shape tapered from the deep groove side toward the intermediate portion. Consequently, the effect of discharging foreign matter or air bubbles that have entered the negative pressure generation groove can be enhanced.
(3) The connections between the inlet portion and the outlet portion and the deep groove each include the stagnation portion that intersects the flow direction of fluid in the deep groove and spreads toward the opposite-to-sealed-fluid side. Consequently, the pumping effect produced by the flow can be further enhanced, and the fluid sucking action can be further increased from the intermediate portion to the vicinity of the outlet portion.
(4) The stagnation portion at the inlet portion is shaped to spread upstream, and the stagnation portion at the outlet portion is shaped to spread downstream. Consequently, the pumping effect produced by the flow can be further enhanced, and the fluid sucking action can be further increased from the intermediate portion to the vicinity of the outlet portion.
(5) The deep groove includes the radial deep groove and the circumferential deep groove. Consequently, the deep groove can serve to guide fluid that tends to leak from the sealed fluid side to the opposite-to-sealed-fluid side of the sliding face, to release the fluid to the sealed fluid side, and allows the positive pressure generation grooves and the negative pressure generation groove to be arranged rationally without waste on the sliding face of the sliding part that rotates in both forward and reverse directions.
(6) The positive pressure generation grooves are arranged on opposite sides of the radial deep groove symmetrically about the radial line connecting the circumferential center of the radial deep groove and the rotation center. Consequently, the arrangement of the positive pressure generation grooves on the sliding face can be a rational one suitable for the sliding part that rotates in both forward and reverse directions.
(7) The negative pressure generation groove is arranged symmetrically about the radial line connecting the circumferential center of the negative pressure generation groove and the rotation center. Consequently, the arrangement of the negative pressure generation groove on the sliding face can be a rational one suitable for the sliding part that rotates in both forward and reverse directions.

(8) The circumferential deep groove is arranged in the radial space between the positive pressure generation grooves and the negative pressure generation groove, and is arranged to extend circumferentially continuously through the radial deep groove. Consequently, the circumferential deep groove can release dynamic pressure (positive pressure) generated at the positive pressure generation mechanisms to the pressure of high pressure-side fluid, to prevent fluid from flowing into the negative pressure generation mechanism on the low-pressure side and weakening the negative pressure generation capacity of the negative pressure generation mechanism.

DESCRIPTION OF EMBODIMENTS

Hereinafter with reference to the drawings, a mode for carrying out this invention will be described illustratively based on embodiments. However, the dimensions, materials, shapes, relative arrangements, and the like of components described in the embodiments are not intended to limit the scope of the present invention only to them unless otherwise described explicitly.

First Embodiment

With reference to FIGS. 1 to 4B, a sliding component according to a first embodiment of the present invention will be described.

In the embodiment described below, a mechanical seal that is an example of the sliding component is taken as an example. The outer peripheral side of sliding parts constituting the mechanical seal is described as the sealed fluid side, and the inner peripheral side as the opposite-to-sealed-fluid side (atmosphere side). However, the present invention is not limited to this, and is applicable to a case where the sealed fluid side and the opposite-to-sealed-fluid side (atmosphere side) are reversed.

Figure 1:
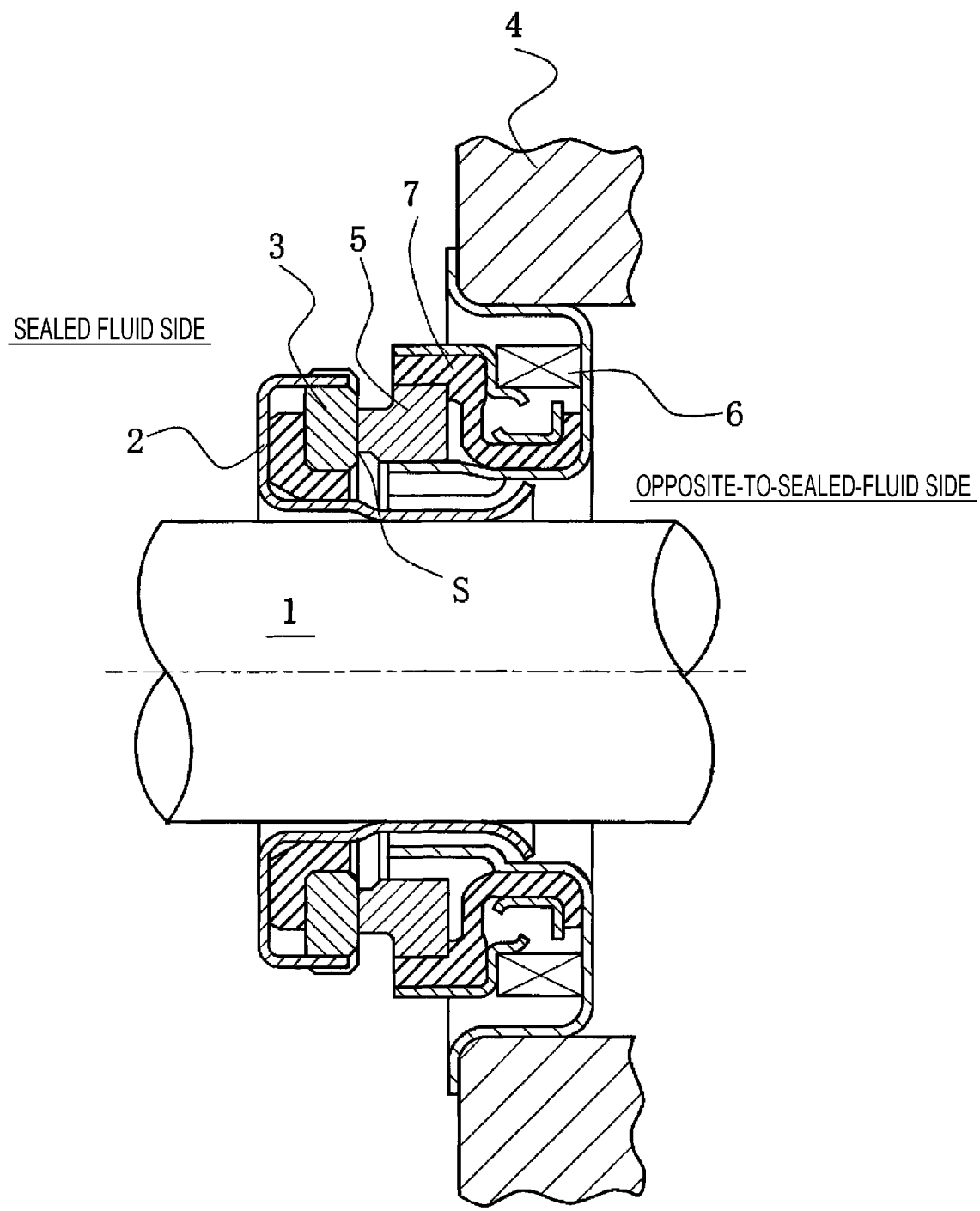
FIG. 1 is a vertical cross-sectional view showing an example of a mechanical seal according to a first embodiment of the present invention.

FIG. 1 is a vertical cross-sectional view showing an example of the mechanical seal, which is an inside mechanical seal in the form of sealing a sealed fluid on the sealed fluid side that tends to leak from the outer periphery toward the inner periphery of a sliding face. The mechanical seal is provided with an annular rotating-side seal ring 3 that is one sliding part provided via a sleeve 2 at a rotating shaft 1 to drive a pump impeller (not shown) on the sealed fluid side, in a state of being integrally rotatable with the rotating shaft 1, and an annular stationary-side seal ring 5 that is the other sliding part provided at a pump housing 4 in non-rotating and axially movable states. With a coiled wave spring 6 and a bellows 7 both axially biasing the stationary-side seal ring 5, the rotating-side seal ring 3 and the stationary-side seal ring 5 slide in close contact on each other's sliding faces S mirror-finished by lapping or the like. That is, the mechanical seal prevents, at each other's sliding faces S of the rotating-side seal ring 3 and the stationary-side seal ring 5, the sealed fluid from flowing out from the outer periphery of the rotating shaft 1 into the atmosphere side.

Figure 2:
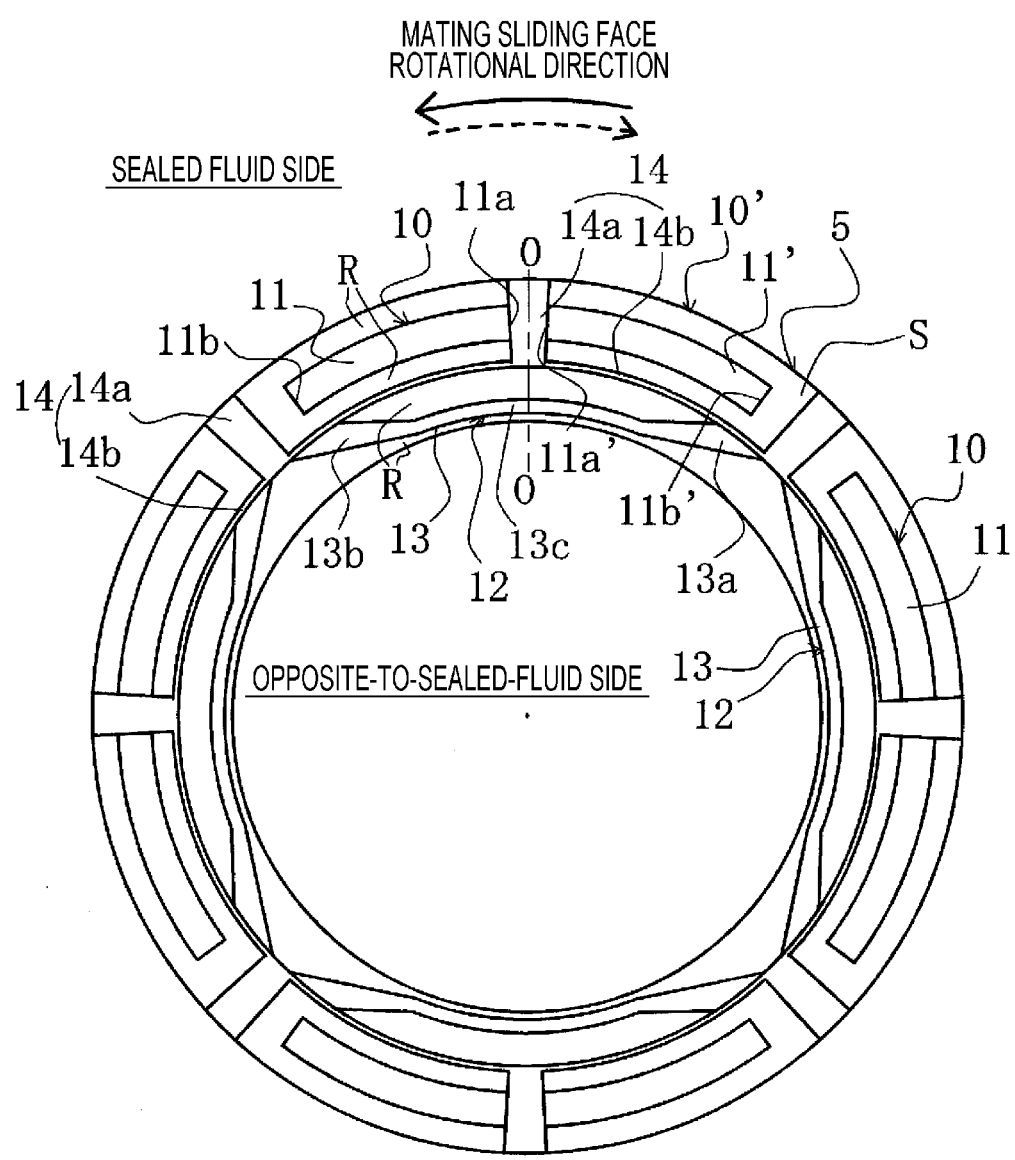
FIG. 2 is a plan view showing a sliding face of a sliding part according to the first embodiment of the present invention.

FIG. 2 shows a sliding face of a sliding part according to the first embodiment of the present invention. Here, a case where surface texture of the present invention is applied to the sliding face of the stationary-side seal ring 5 in FIG. 1 will be described as an example.

A case where surface texture of the present invention is applied to the sliding face of the rotating-side seal ring 3 is basically the same as the case to be described. However, in that case, radial grooves only need to communicate with the sealed fluid side, and thus do not need to be extended to the outer peripheral side of the sliding face.

In FIG. 2, the outer peripheral side of the sliding face of the stationary-side seal ring 5 is the sealed fluid side, and the inner peripheral side is the opposite-to-sealed-fluid side (atmosphere side). The mating sliding face rotates in both forward and reverse directions. In FIG. 2, the description is based on the assumption that the mating sliding face rotates in a counterclockwise direction as shown by a solid-line arrow.

The sliding face S of the stationary-side seal ring 5 is provided with positive pressure generation grooves 11 and 11' as positive pressure generation mechanisms 10 and 10' located on the sealed fluid side, and is provided with negative pressure generation grooves 13 as negative pressure generation mechanisms 12 located on the opposite-to-sealed-fluid side and separated from the opposite-to-sealed-fluid side by a land R, and is provided with deep grooves 14 communicating with the sealed fluid side on the sealed fluid side of the negative pressure generation grooves 13.

The land R refers to a smooth portion of the sliding face S.

Each deep groove 14 includes a radial deep groove 14a and a circumferential deep groove 14b. The circumferential deep groove 14b is arranged to extend circumferentially continuously through the radial deep groove 14a.

In FIG. 2, the eight radial deep grooves 14a are spaced evenly. Each circumferential deep groove 14b is arranged in a radial space between the positive pressure generation grooves 11 and the negative pressure generation groove 13.

The positive pressure generation mechanisms 10 and 10' are formed of Rayleigh steps. The positive pressure generation grooves (hereinafter, sometimes referred to as "grooves") 11 and 11' are arranged on opposite sides of the radial deep groove 14a symmetrically about a radial line O-O connecting the circumferential center of the radial deep groove 14a and the rotation center. An upstream end 11a of the groove 11 communicates with the radial deep groove 14a, and a downstream end 11b thereof forms a narrowed step, so that when the mating sliding face rotates in the counterclockwise direction shown by the solid line, positive pressure is generated at the groove 11 located downstream of the radial deep groove 14a (to the left of the radial deep groove 14a in FIG. 2).

Conversely, an upstream end 11a' of the groove 11' communicates with the radial deep groove 14a, and a downstream end 11b' thereof forms a narrowed step, so that when the mating sliding face rotates in a clockwise direction shown by a broken line, positive pressure is generated at the groove 11' located downstream of the radial deep groove 14a (to the right of the radial deep groove 14a in FIG. 2).

Each negative pressure generation groove 13 extends circumferentially such that it is symmetrical about the radial line O-O connecting the circumferential center of the negative pressure generation groove 13 and the rotation center, and is provided in an arc shape such that an upstream inlet portion 13a and a downstream outlet portion 13b communicate with the circumferential deep groove 14b, and an intermediate portion 13c between the inlet portion 13a and the outlet portion 13b is located on the opposite-to-sealed-fluid side of the inlet portion 13a and the outlet portion 13b (on the inner peripheral edge side of the sliding face).

The planar shapes of the inlet portion 13a and the outlet portion 13b each intersect the tangential direction to the circumferential deep groove 14b (the flow direction of fluid), and extend toward the intermediate portion 13c located on the opposite-to-sealed-fluid side (the inner peripheral edge side of the sliding face), and are each formed in a tapered shape tapered from the circumferential deep groove 14b side toward the intermediate portion 13c.

The depths and widths of the positive pressure generation grooves 11 and 11', the negative pressure generation grooves 13, and the deep grooves 14 are determined suitably according to the diameter of the sliding part, the width of the sliding face, relative sliding speed, sealing and lubrication conditions, and so on. For example, the depth of the positive pressure generation grooves 11 and 11' is several times the depth of the negative pressure generation grooves 13, and the depth of the deep grooves 14 is ten times or more the depth of the positive pressure generation grooves 11 and 11'.

Next, with reference to FIGS. 3 to 4B, the negative pressure generation grooves 13 will be described.

Figure 3:
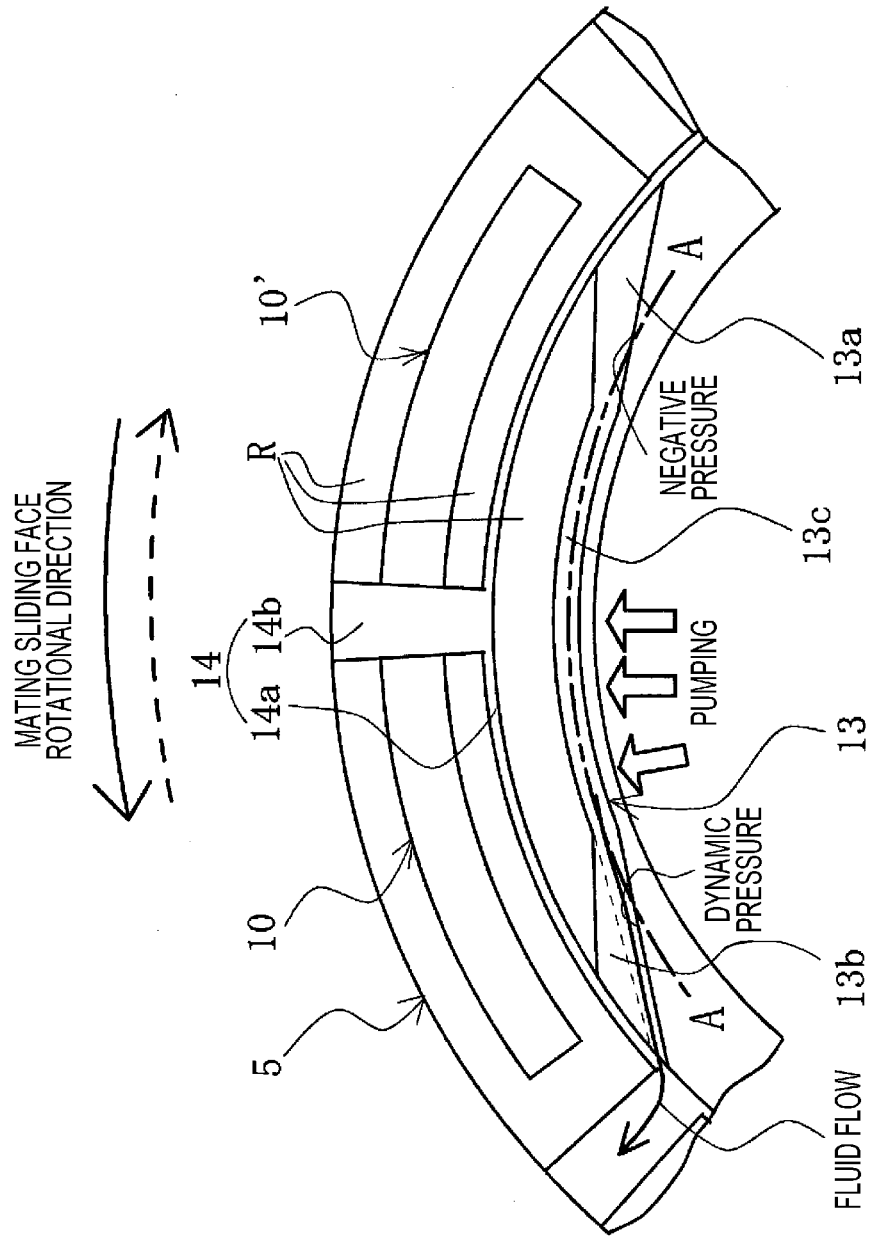
FIG. 3 is an enlarged view of an enlarged principal portion in FIG. 2.
Figure 4:
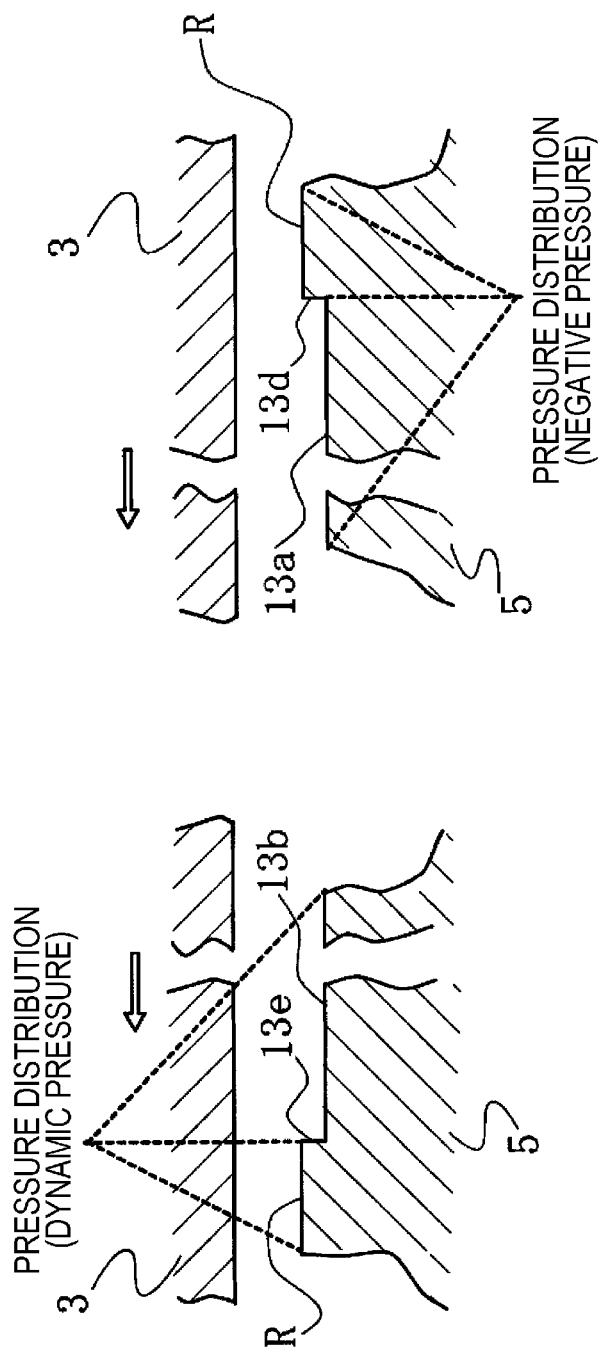
FIGS. 4A and 4B are cross-sectional views taken along line A-A in FIG. 3, also showing a mating sliding face for explanatory convenience.

In FIG. 3, the negative pressure generation groove 13 is bent from the inlet portion 13a and the outlet portion 13b toward the intermediate portion 13c located on the opposite-to-sealed-fluid side (the inner peripheral edge side of the sliding face). Consequently, as shown in FIGS. 4A and 4B, negative pressure is generated at the inlet portion 13a, and cavitation occurs in the intermediate portion 13c. Also, dynamic pressure (positive pressure) is generated at the outlet portion 13b.

Specifically, in FIG. 4A, in which the rotating ring 3 rotationally moves in a counterclockwise direction relative to the stationary ring 5 as shown by an arrow, when the negative pressure generation groove 13 is formed on the sliding face S of the stationary ring 5, there is a narrowed gap (step) 13e at the outlet portion 13b located downstream of the negative pressure generation groove 13. The sliding face of the opposing rotating ring 3 is flat.

When the rotating ring 3 relatively moves in the direction shown by the arrow, fluid intervening between the sliding faces of the rotating ring 3 and the stationary ring 5 tends to follow and move in the movement direction of the rotating ring 3 due to its viscosity. Consequently, at that time, dynamic pressure (positive pressure) as shown by broken lines is generated by the presence of the narrowed gap (step) 13e.

On the other hand, in FIG. 4B, in which the rotating ring 3 rotationally moves in a counterclockwise direction relative to the stationary ring 5 as shown by an arrow, when the negative pressure generation groove 13 is formed on the sliding face S of the stationary ring 5, there is a widened gap (step) 13d at the inlet portion 13a located upstream of the negative pressure generation groove 13. The sliding face of the opposing rotating ring 3 is flat.

When the rotating ring 3 relatively moves in the direction shown by the arrow, fluid intervening between the sliding faces of the rotating ring 3 and the stationary ring 5 tends to follow and move in the movement direction of the rotating ring 3 due to its viscosity. Consequently, at that time, dynamic pressure (negative pressure) as shown by broken lines is generated by the presence of the widened gap (step) 13d.

Therefore, negative pressure is generated at the inlet portion 13a located upstream in the negative pressure generation groove 13, and positive pressure is generated at the outlet portion 13b located downstream. And cavitation occurs from a negative pressure generation region of the inlet portion 13a to the intermediate portion 13c.

Reference letter R denotes lands constituting a sealing face S.

Since the negative pressure generation groove 13 is a shallow groove, the amount of inflow of fluid from the deep groove 14 is small. Further, as shown in FIG. 3, fluid flows from the outlet portion 13b to the circumferential deep groove 14b smoothly. Consequently, dynamic pressure (positive pressure) generated at the outlet portion 13b is extremely small. A pumping effect produced by the flow produces fluid sucking action from the intermediate portion 13c to the vicinity of the outlet portion 13b.

Here, when the mating sliding face rotates in a counterclockwise direction shown by a solid line, the positive pressure generation groove (groove) 11 sucks at its upstream end fluid from the sealed fluid side through the radial deep groove 14a, generates positive pressure at the narrowed step positive pressure 11b, widens the gap between the sliding faces S sliding relatively by the generated positive pressure, and forms a liquid film between the sliding faces S.

The negative pressure generation groove 13 generates negative pressure in a cavitation formation region, resulting in occurrence of cavitation, produces pumping action since cavitation internal pressure is negative pressure lower than atmospheric pressure, causes fluid on the opposite-to-sealed-fluid side to flow into the negative pressure generation groove 13 as shown by arrows in FIG. 3, resulting in creation of suction on the opposite-to-sealed-fluid side of the sliding face, and prevents leakage from the sealed fluid side to the opposite-to-sealed-fluid side. The fluid sucked into the negative pressure generation groove 13 is discharged at the downstream end thereof to the sealed fluid side through the circumferential deep groove 14b and the radial deep groove 14a connected to the sealed fluid side.

Further, the circumferential deep grooves 14b of the deep grooves 14 serve to guide fluid that tends to leak from the sealed fluid side to the opposite-to-sealed-fluid side of the sliding face S, to release the fluid to the sealed fluid side through the radial deep grooves 14a.

Specifically, the circumferential deep groove 14b of each deep groove 14 serves to release dynamic pressure (positive pressure) generated at the positive pressure generation mechanism 10, for example, a Rayleigh step mechanism to the pressure of high pressure-side fluid, to prevent fluid from flowing into the negative pressure generation mechanism 12 on the low-pressure side, that is, the negative pressure generation groove 13 and weakening the negative pressure generation capacity of the negative pressure generation mechanism 12, and serves to guide, to the circumferential deep groove 14b, fluid that tends to flow into the oppositeto-sealed-fluid side due to pressure generated at the positive pressure generation mechanism 10 on the high-pressure side, to release the fluid to the sealed fluid side through the radial deep groove 14a.

In the present invention, since the upstream inlet portion 13a and the downstream outlet portion 13b of each negative pressure generation groove 13 (in the reverse rotation, the inlet portion 13a is downstream, and the outlet portion 13b is upstream) each communicate with the circumferential deep groove 14b of the deep groove 14, when foreign matter or air bubbles enter the negative pressure generation groove 13, the foreign matter or air bubbles are discharged to the sealed fluid side through the deep groove 14. In particular, since a portion of each negative pressure generation groove 13 connected to the circumferential deep groove 14b is smoothly expanded, the foreign matter or air bubbles are moved smoothly to the circumferential deep groove 14b and discharged to the sealed fluid side without staying in the negative pressure generation groove 13.

The sliding component according to the first embodiment of the present invention is as described above, and has the following outstanding effects.

(1) In the sliding component with the pair of sliding parts of which the rotating-side sliding part rotates in both forward and reverse directions, the sliding face of at least one of the sliding parts is provided with the positive pressure generation grooves 11 and 11' located on the sealed fluid side, and is provided with the negative pressure generation grooves 13 located on the opposite-to-sealed-fluid side and separated from the opposite-to-sealed-fluid side by the land R, and is provided with the deep grooves 14 communicating with the sealed fluid side on the sealed fluid side of the negative pressure generation grooves 13, the upstream ends of the positive pressure generation grooves 11 and 11' communicate with the deep groove 14, the upstream inlet portion 13a and the downstream outlet portion 13b of each negative pressure generation groove 13 communicate with the deep groove 14, and the intermediate portion 13c between the inlet portion 13a and the outlet portion 13b is located on the opposite-to-sealed-fluid side of the inlet portion 13a and the outlet portion 13b. Consequently, in the sliding component that rotates in both forward and reverse directions, the gap between the sliding faces S sliding relatively is widened by positive pressure, a liquid film is formed between the sliding faces S, and suction is created on the opposite-to-sealed-fluid side of the sliding face, preventing leakage from the sealed fluid side to the opposite-to-sealed-fluid side. Further, even when foreign matter or air bubbles enter the negative pressure generation grooves 13, the foreign matter or air bubbles are discharged to the sealed fluid side through the deep grooves 14, so that the sealing function of the sliding faces can be maintained for a long time.

(2) The inlet portions 13a and the outlet portions 13b are each formed in a tapered shape tapered from the side of the deep groove 14 toward the intermediate portion 13c, so that an effect of discharging foreign matter or air bubbles that have entered the negative pressure generation grooves 13 can be enhanced.

(3) The deep grooves 14 include the radial deep grooves 14a and the circumferential deep grooves 14b to be able to serve to guide fluid that tends to leak from the sealed fluid side to the opposite-to-sealed-fluid side of the sliding face S, to release the fluid to the sealed fluid side, and allow the positive pressure generation grooves 11 and 11' and the negative pressure generation grooves 13 to be arranged rationally without waste on the sliding face of the sliding part that rotates in both forward and reverse directions.

(4) Since the positive pressure generation grooves 11 and 11' are arranged on opposite sides of the radial deep groove 14a symmetrically about the radial line O-O connecting the circumferential center of the radial deep groove 14a and the rotation center, the arrangement of the positive pressure generation grooves 11 and 11' on the sliding face can be a rational one suitable for the sliding part that rotates in both forward and reverse directions.

(5) Since each negative pressure generation groove 13 is arranged symmetrically about the radial line O-O connecting the circumferential center of the negative pressure generation groove 13 and the rotation center, the arrangement of the negative pressure generation grooves 13 on the sliding face can be a rational one suitable for the sliding part that rotates in both forward and reverse directions.

(6) Since the circumferential deep grooves 14b are each arranged in the radial space between the positive pressure generation grooves 11 and 11' and the negative pressure generation groove 13, and are arranged to extend circumferentially continuously through the radial deep grooves 14a, dynamic pressure (positive pressure) generated at the positive pressure generation mechanisms 10 can be released to the pressure of the high pressure-side fluid, to prevent fluid from flowing into the negative pressure generation mechanisms 12 on the low-pressure side and weakening the negative pressure generation capacity of the negative pressure generation mechanisms 12.

Second Embodiment

Figure 5:
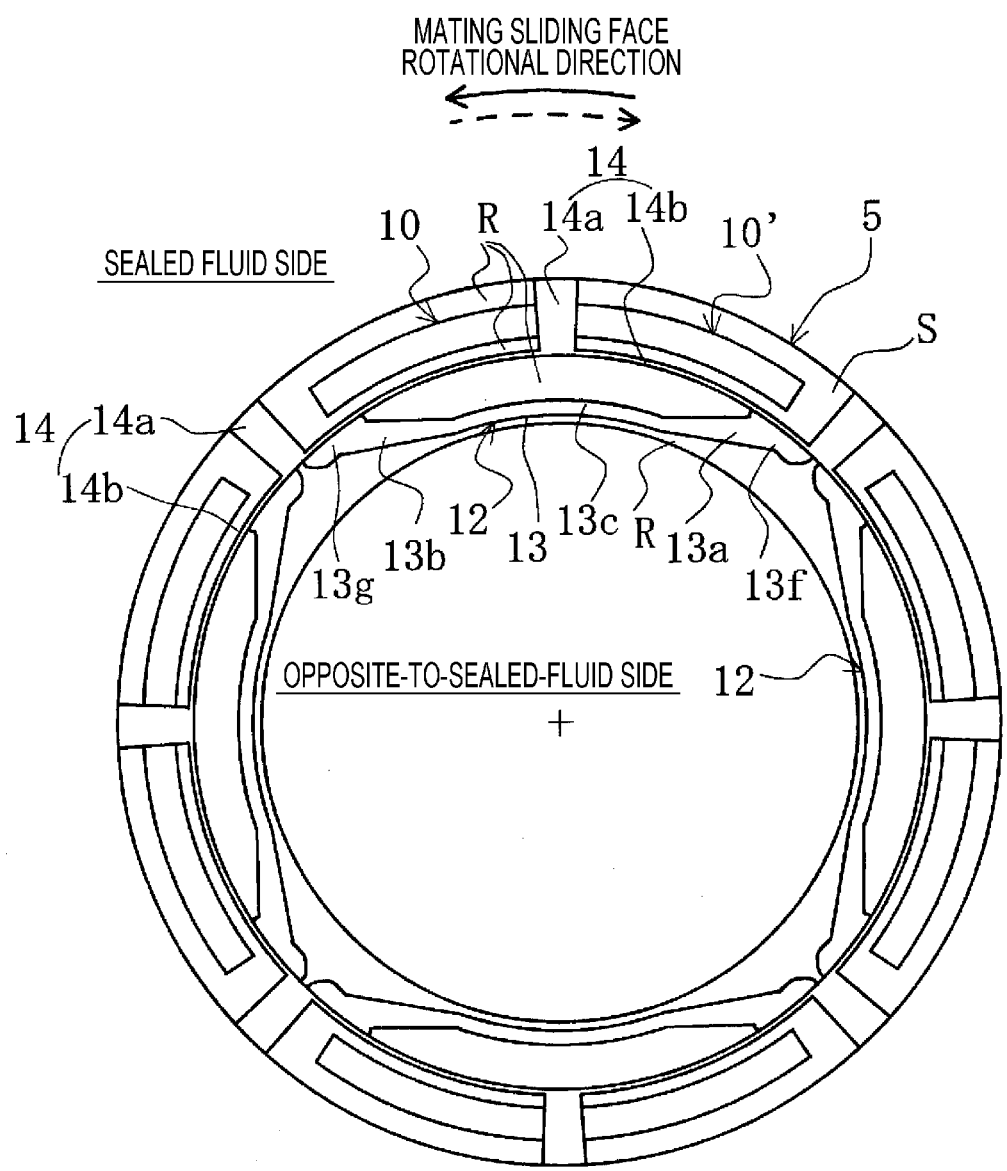
FIG. 5 is a plan view showing a sliding face of a sliding part according to a second embodiment of the present invention.

With reference to FIG. 5, a sliding part according to a second embodiment of the present invention will be described.

The same reference numerals are assigned to the same members as those in the first embodiment without duplicated explanations.

The sliding part according to the second embodiment shown in FIG. 5 is different from that of the first embodiment in the planar shape of negative pressure generation grooves, but in the other basic configuration is identical to that of the first embodiment.

In FIG. 5, at connections between an inlet portion 13a and an outlet portion 13 of a negative pressure generation groove 13 and a circumferential deep groove 14b, stagnation portions 13f and 13g are provided, respectively, which intersect the flow direction of fluid in the circumferential deep groove 14b and spread toward the opposite-to-sealed-fluid side.

In each negative pressure generation groove 13 shown in FIG. 5, the stagnation portions 13f and 13g intersect at right angles the flow direction of fluid in the circumferential deep groove 14b, and spread toward the opposite-to-sealed-fluid side.

By the provision at the inlet portion 13a of the stagnation portion 13f that intersects at right angles the flow direction of fluid in the circumferential deep groove 14b and spreads toward the opposite-to-sealed-fluid side, the amount of fluid flowing into the negative pressure generation groove 13 is further reduced, and, although the presence of the stagnation portion 13g slightly reduces the discharge of fluid at the outlet portion 13b, the generation of dynamic pressure (positive pressure) at the outlet portion 13b is further reduced. Consequently, a pumping effect produced by the flow can be enhanced, and fluid sucking action can be further increased from an intermediate portion 13c to the vicinity of the outlet portion 13b.

Third Embodiment

Figure 6:
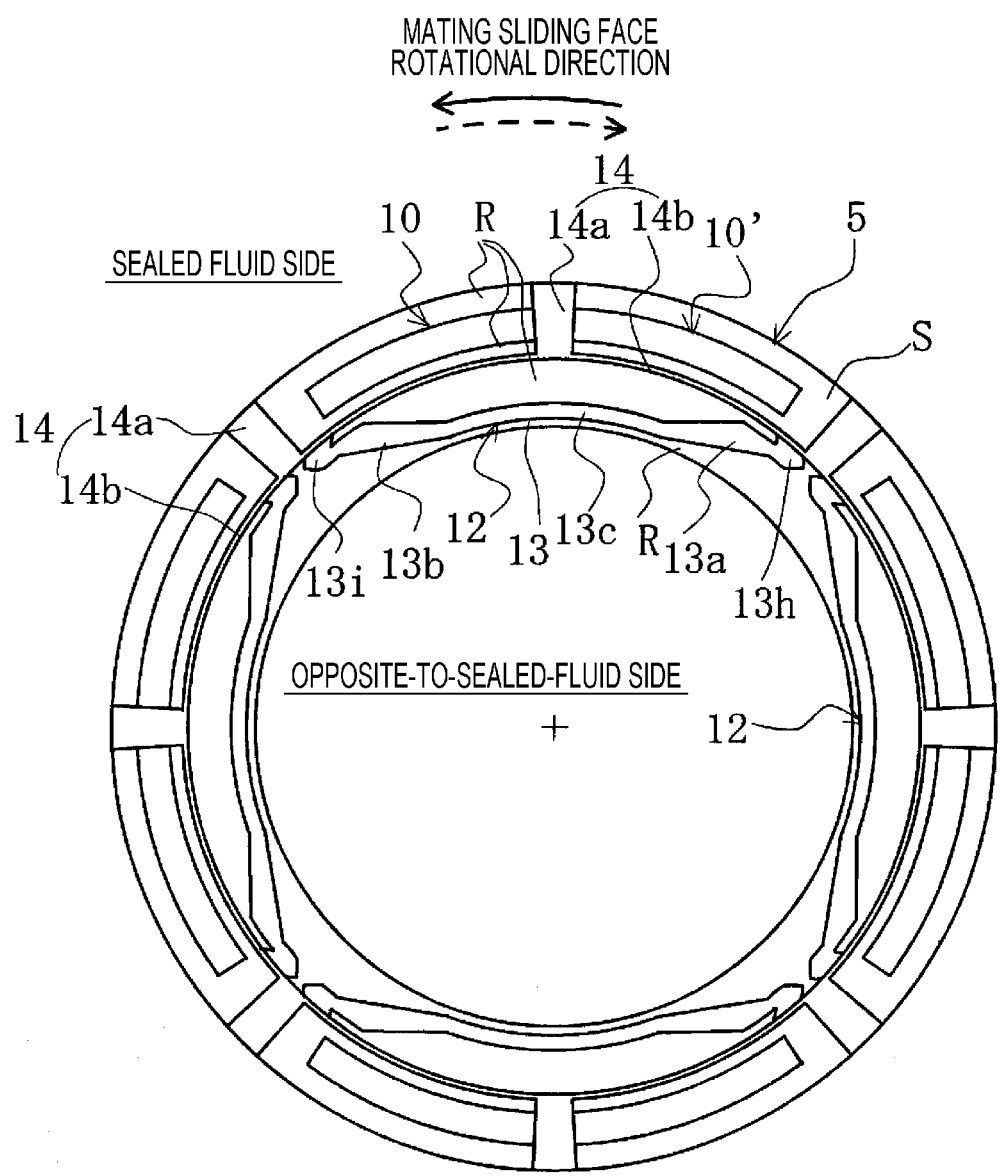
FIG. 6 is a plan view showing a sliding face of a sliding part according to a third embodiment of the present invention.

With reference to FIG. 6, a sliding part according to a third embodiment of the present invention will be described.

The same reference numerals are assigned to the same members as those in the first embodiment without duplicated explanations.

The sliding part according to the third embodiment shown in FIG. 6 is different from that of the first embodiment in the planar shape of negative pressure generation grooves, but in the other basic configuration is identical to that of the first embodiment.

In FIG. 6, at a connection between an inlet portion 13a of a negative pressure generation groove 13 and a circumferential deep groove 14b, a stagnation portion 13h is provided which intersects the flow direction of fluid in the circumferential deep groove 14b and spreads upstream toward the opposite-to-sealed-fluid side, and at a connection between an outlet portion 13 the outlet portion and the circumferential deep groove 14b, a stagnation portion 13i is provided which intersects the flow direction of fluid in the circumferential deep groove 14b and spreads downstream toward the opposite-to-sealed-fluid side.

By the provision at the inlet portion 13a of the stagnation portion 13h that intersects the flow direction of fluid in the circumferential deep groove 14b and spreads upstream toward the opposite-to-sealed-fluid side, the amount of fluid flowing into the negative pressure generation groove 13 is further reduced, and, although the presence of the stagnation portion 13i the stagnation portion 13g slightly reduces the discharge of fluid at the outlet portion 13b, the generation of dynamic pressure (positive pressure) at the outlet portion 13b is further reduced. Consequently, a pumping effect produced by the flow can be further enhanced, and fluid sucking action can be further increased from an intermediate portion 13c to the vicinity of the outlet portion 13b.

Although the embodiments of the present invention have been described above with reference to the drawings, a specific configuration thereof is not limited to the embodiments. Any changes and additions made to them without departing from the scope of the present invention are included in the present invention.

For example, the embodiments have described the case where the sliding part is used as one of a pair of rotating seal ring and stationary seal ring in a mechanical seal device. The sliding part can also be used as a bearing sliding part that slides on a rotating shaft while sealing lubricating oil on axially one side of a cylindrical sliding face.

Further, for example, the embodiments have described the case where a sealed fluid is present on the outer peripheral side. The present invention is applicable to a case where a sealed fluid is on the inner peripheral side.

Further, for example, the embodiments have described the case where the positive pressure generation mechanisms, the negative pressure generation mechanisms, and the deep grooves are provided on the stationary-side seal ring of the mechanical seal constituting the sliding component. Conversely, they may be provided on the rotating-side seal ring.

Further, for example, the positive pressure generation mechanisms may be provided on one sliding ring, and the negative pressure generation mechanisms on the other sliding ring, and the deep grooves may be provided on one of the sliding rings.

Further, for example, the embodiments have described the example where the eight radial grooves are spaced evenly, and correspondingly, the four positive pressure generation grooves as the positive pressure generation mechanisms are provided (four are provided for reverse rotation, the total eight), and the four negative pressure generation grooves as the negative pressure generation mechanisms are provided, which is not limiting. Smaller than this, for example, four radial grooves may be spaced evenly, or larger than this, for example, twelve radial grooves may be spaced evenly.

Further, for example, the embodiments have described the case where the positive pressure generation mechanisms are each formed of a Rayleigh step mechanism, which is not limiting. For example, the positive pressure generation mechanisms may each be formed of a dimple. It is essential only that they each are a mechanism for generating positive pressure.

When the positive pressure generation mechanisms are dimples, the deep grooves do not need to be connected to the upstream ends of the dimples.

The invention claimed is:

1. A sliding component comprising:
a pair of sliding parts of which a rotating-side sliding part rotates in both forward and reverse directions, wherein
at least one of the sliding parts has a sliding face including positive pressure generation grooves located on a sealed fluid side, a negative pressure generation groove located on an opposite-to-sealed-fluid side and separated from an opposite-to-sealed-fluid side by a land, and a deep groove communicating with a sealed fluid side on the sealed fluid side of the negative pressure generation groove,
the deep groove includes a radial deep groove and a circumferential deep groove, the circumferential groove extending continuously in a circumferential direction through the radial deep groove,
the positive pressure generation grooves each have an upstream end communicating with the radial deep groove,
the circumferential deep groove is arranged in a radial space between the positive pressure generation grooves and the negative pressure generation groove, and
the negative pressure generation groove has an upstream inlet portion, a downstream outlet portion, an intermediate portion between the inlet portion and the outlet portion, a first connection connecting the upstream inlet portion to the circumferential deep groove, and a second connection connecting the downstream outlet portion to the circumferential deep groove,
the upstream inlet portion and the downstream outlet portion each communicate with the sealed fluid side via the first and second connections, the circumferential deep groove, and the radial deep groove, and
a portion of the land is located between the circumferential deep groove and the intermediate portion, and between the upstream inlet portion and the downstream outlet portion.

2. The sliding component according to claim 1, wherein the inlet portion and the outlet portion are each formed in a tapered shape tapered from the deep groove side toward the intermediate portion.

3. The sliding component according to claim 1, wherein each of the first and second connections include a stagnation portion that intersects a flow direction of fluid in the circumferential deep groove and spreads toward the opposite-to-sealed-fluid side.

4. The sliding component according to claim 3, wherein the stagnation portion at the first connection at the inlet portion is shaped to spread upstream, and the stagnation portion at the second connection at the outlet portion is shaped to spread downstream.

5. The sliding component according to claim 1, wherein the positive pressure generation grooves are arranged on opposite sides of the radial deep groove symmetrically about a radial line connecting a circumferential center of the radial deep groove and a rotation center.

6. The sliding component according to claim 1, wherein the negative pressure generation groove is arranged symmetrically about a radial line connecting a circumferential center of the negative pressure generation groove and a rotation center.

* * * * *